(12) United States Patent
Johnson

(10) Patent No.: US 7,717,149 B2
(45) Date of Patent: May 18, 2010

(54) DEVICE FOR APPLYING IDENTIFICATION TAGS AROUND A MOVING LINEAL OBJECT ON A CONTINUOUS FLOW BASIS

(75) Inventor: Ryan P. Johnson, Woodbury, MN (US)

(73) Assignee: Harvest Tec, Inc., Hudson, WI (US)

( * ) Notice: Subject to any disclaimer, the term of this patent is extended or adjusted under 35 U.S.C. 154(b) by 304 days.

(21) Appl. No.: 11/897,950

(22) Filed: Sep. 4, 2007

(65) Prior Publication Data

US 2009/0056880 A1    Mar. 5, 2009

(51) Int. Cl.
*B32B 38/10* (2006.01)

(52) U.S. Cl. .................................. 156/483; 156/537

(58) Field of Classification Search ................. 156/483, 156/566, 537; 493/376, 961; 53/135.1, 136.1
See application file for complete search history.

(56) References Cited

U.S. PATENT DOCUMENTS 2,367,189 A * 1/1945 Avery .................... 156/DIG. 6
5,185,983 A * 2/1993 Slater ......................... 156/483

* cited by examiner

*Primary Examiner*—Khanh Nguyen
*Assistant Examiner*—John Blades
(74) *Attorney, Agent, or Firm*—Robert A. Elwell

(57) ABSTRACT

A continuous flow of a lineal object such as wire, banding or twine is tagged with the device of this invention with an adhesive-backed tag that is folded around the lineal object as it passes underneath and thru the device.

17 Claims, 4 Drawing Sheets

DEVICE FOR APPLYING IDENTIFICATION TAGS AROUND A MOVING LINEAL OBJECT ON A CONTINUOUS FLOW BASIS

CROSS REFERENCE TO RELATED APPLICATIONS

This application is related to U.S. patent application Ser. No. 09/507,591, entitled. A System and Method for Identifying Bales of Hay" filed Jan. 24, 2006.

STATEMENT REGARDING FEDERALLY SPONSORED RESEARCH FOR DEVELOPMENT

Not Applicable.

THE NAMES OF PARTIES ON A JOINT RESEARCH AGREEMENT

Not Applicable.

BACKGROUND

Applying an identification tag around a moving lineal object such as a wire, banding or twine on a repeated continuous basis has many useful applications. The tag applied in this way can be used to identify properties of the wire, banding or twine or it can be used to identify properties about an item encased by lineal objects. When wire, banding or twine is manufactured, they are normally made in an operation where they are generated from a flow-thru manufacturing process on a continuous basis. Prior to the development of the present invention, identification of the lineal object was accomplished with a device or person applying the tag to the object after it had been manufactured and was in a stationary state.

When material is encased with a lineal object such as wire, banding or twine, it is normally encircled with the lineal object which is tied or crimped to itself at the end of a cycle, on a continuous flow basis thus holding the material together in a package. Prior to the development of the present invention, this identification of the item encased was accomplished with a device or person applying the tag to stationary material after it had been packaged.

Many packages of loose material are secured or held together by wire banding or twine encircling the items, such as bales of hay or cotton modules. In a System and Method for Identifying Bales of Hay, recording information to individual bales of hay is disclosed. This information can be recorded on identification tags applied to the bales as they are formed. These are just some of the applications where a device to apply a tag to the continuous flow of a lineal object would be useful.

BRIEF SUMMARY OF THE INVENTION

The device that has been invented applies an adhesive tag around the moving lineal object such as wire, banding or twine. The adhesive tag is dispensed from a roll of continuous tags that are temporarily adhered to a roll of backing. The roll is advanced, initiated by a signal to start the tagging process. The roll, with tags still temporarily adhered to it is routed near the lineal object to be tagged and taken around a sharp bend. At the point of the sharp bend, the label is released from the backing in such a way that it travels underneath the lineal object to be tagged. The object to be tagged has been raised to a position adjacent to the label. The object is released from its raised position at the point where the label is directly underneath it. As the object returns to its original position, it pulls the tag through a squeeze point, thus closing the label around the lineal object adhering the adhesive backing on the label to itself.

DETAILED DESCRIPTION OF THE INVENTION

Figure 1:
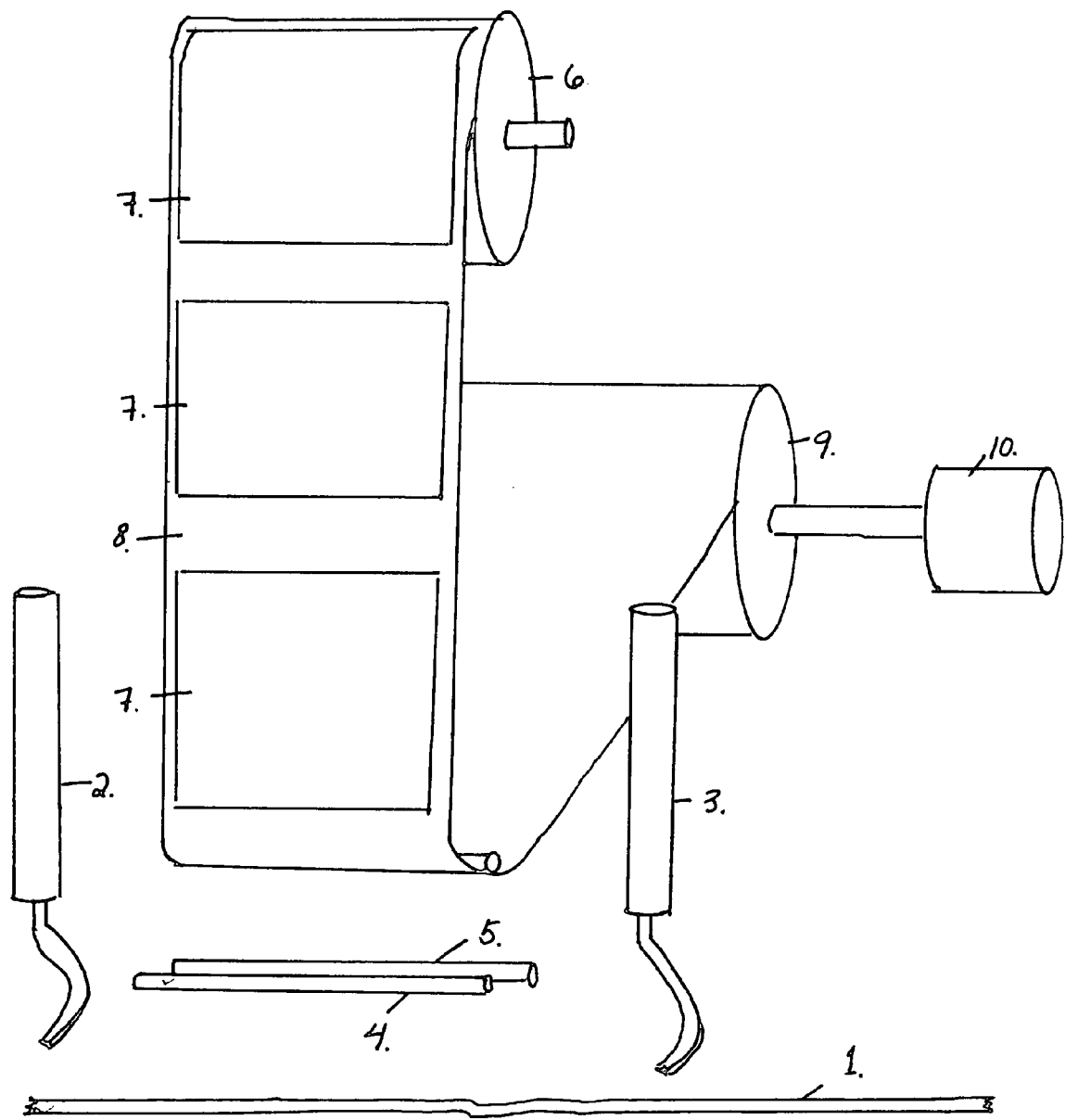
FIG. 1 is a view of the tagging device at the beginning of its cycle.
Figure 2:
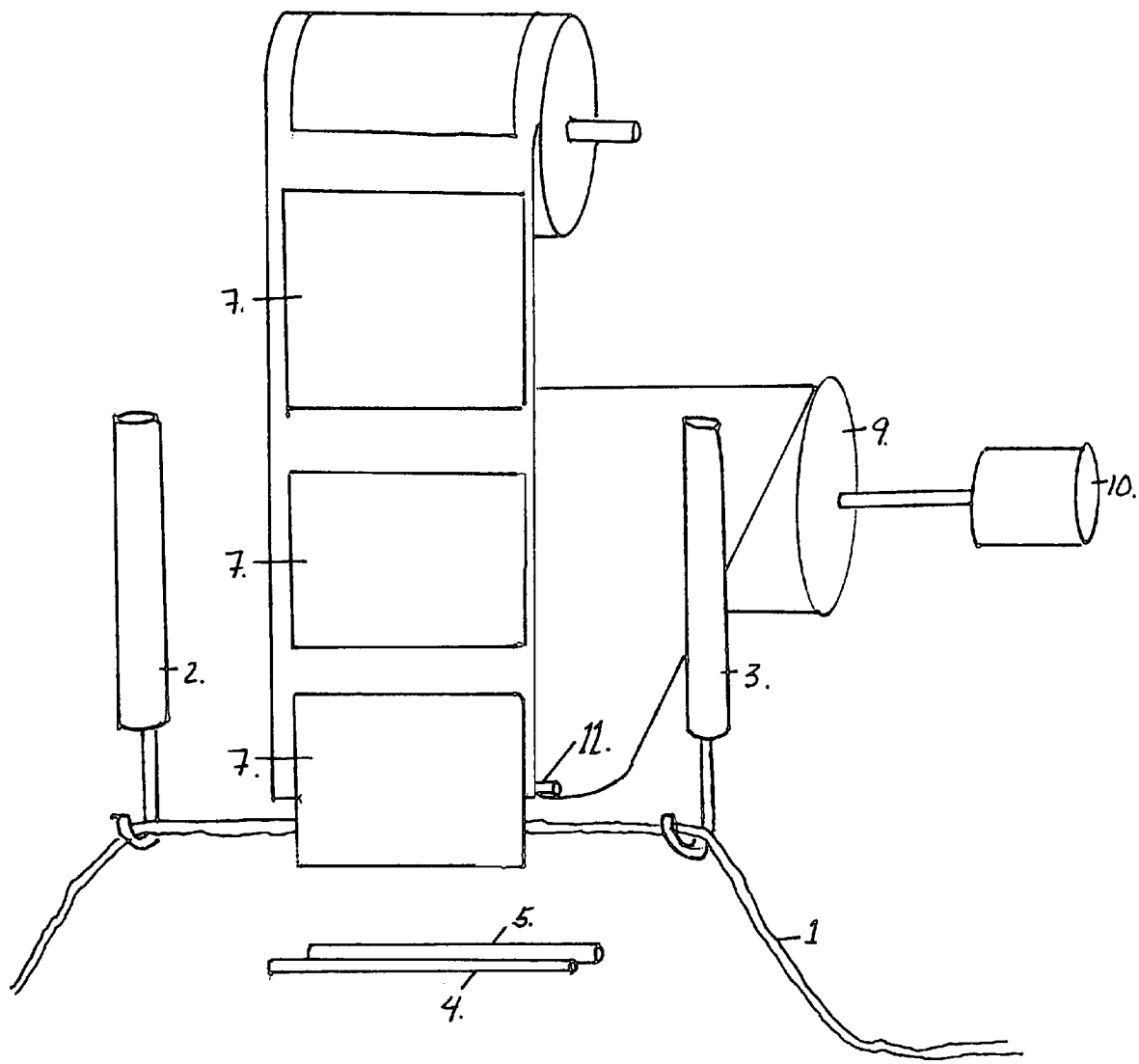
FIG. 2 is a view of the tagging device as the object to be tagged is lifted and the tag to be applied to it is separated from the backing.
Figure 3:
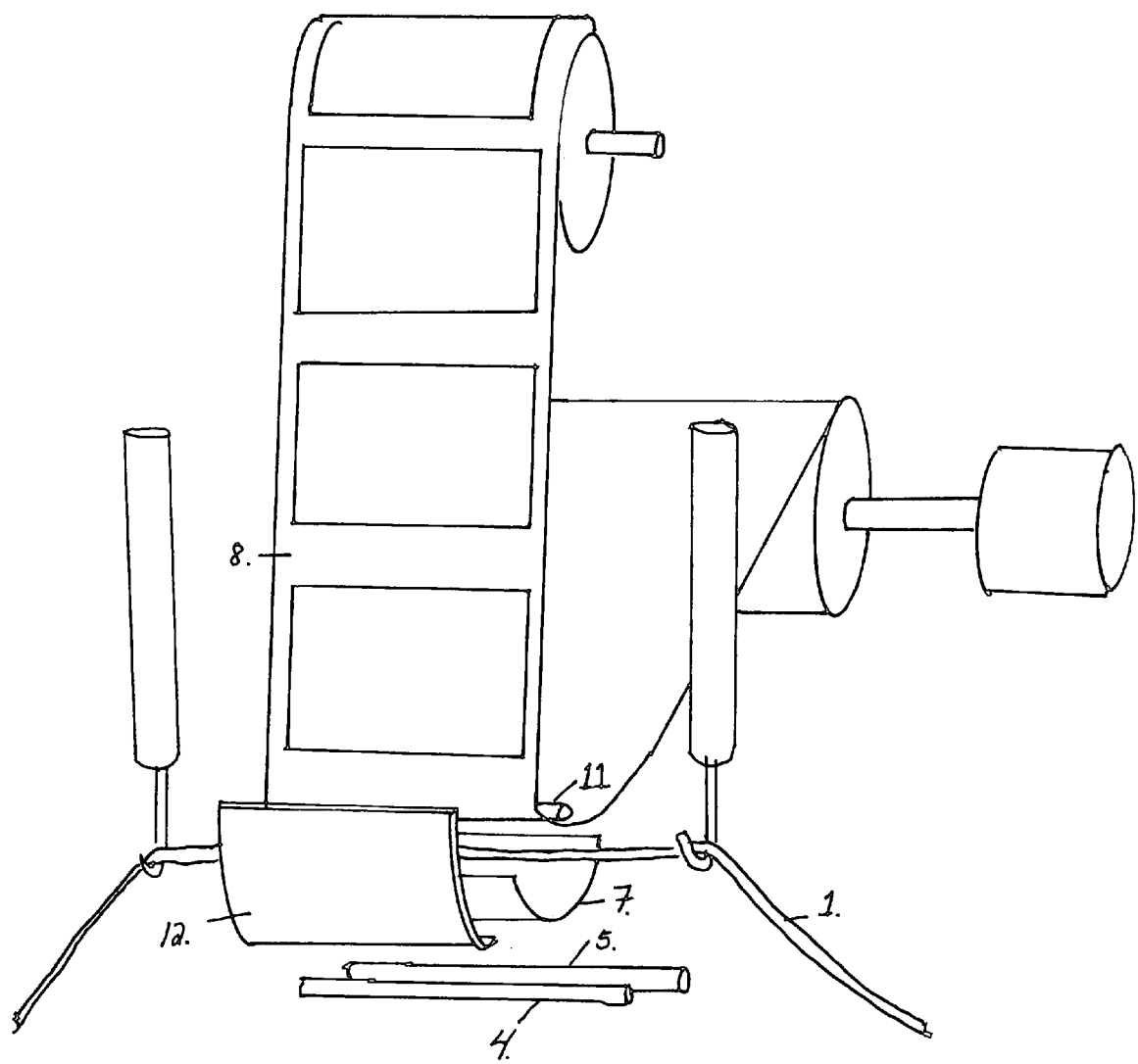
FIG. 3 is a view of the tag positioned under the lineal object to be tagged.
Figure 4:
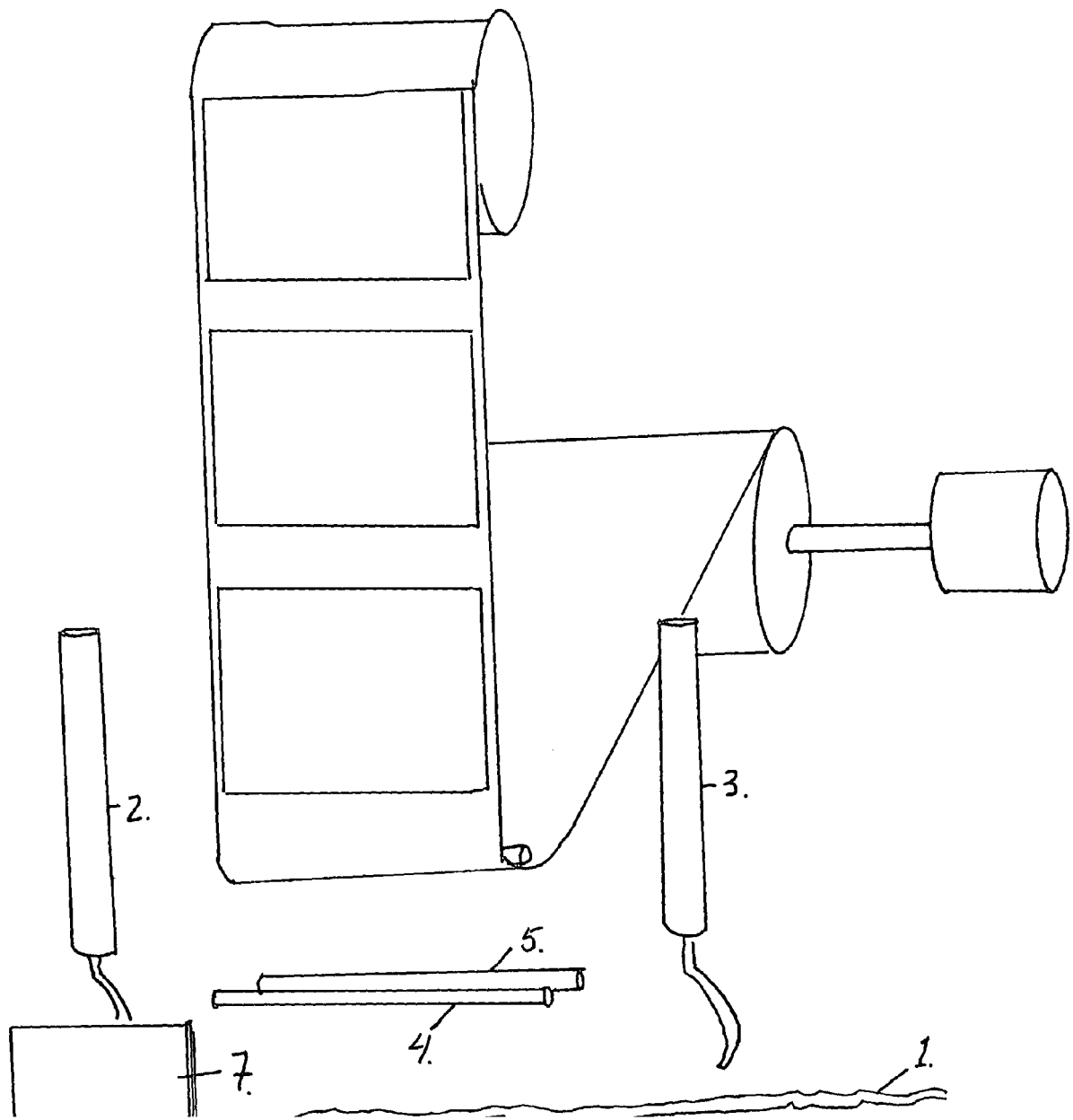
FIG. 4 is the end of the cycle as the lineal object is released and the tag is applied around the object.

The device that has been invented applies a tag around a lineal object such as wire, banding or twine in a continuous cycle as these lineal objects moves under and thru the device. At the beginning of each cycle of applying a tag the lineal object 1-1 is positioned under the entire device. Two lifting members 1-2 and 1-3 are positioned above or to the side of the object to be tagged, but alternatively one lifting member or other means of lifting the lineal object may be employed. A supply roll of tags 1-6 carries a series of tags 1-7 that have an adhesive backing and are temporarily adhered to a continuous roll coated backing 1-8. The backing is routed to a take-up roll 1-9 that is rotated by a drive 1-10 that will pull the backing and labels adhered to it from the supply roll 1-6.

The tagging cycle can be initiated at any time, but commonly is set on an automatic interval based on the desired frequency for tagging. To begin the cycle, the lifting members 2-2 and 2-3 engage and lift the lineal object 2-1 to a position above the compression rollers 2-4 and 2-5. The take-up roll 2-9 is advanced by the drive 2-10 and the backing 2-8 is fed from the supply roll 2-6 for a distance equal to the width of the tag 2-7 and the space between the tags. The backing is routed around a guide roll 2-11, which is oriented in a position related to the take-up roll 2-9 so that the backing makes a sharp bend when passing over the guide roll 2-11. Since the label 2-7 is less flexible than the backing 2-8 and the labels are separate pieces and the backing is a continuous roll, the labels detach from the backing as the backing travels around the guide roll 2-11 at a point adjacent to the guide roll.

Underneath the guide roll 3-11, a peel plate 3-12 is positioned in such a location so that the detached label is guided between the raised lineal object 3-1 and the compression rolls 3-4 and 3-5. The peel plate 3-12 is constructed of smooth material such as sheet metal, so that the non-adhesive side of the label 3-7 will slide across it as the label leaves the backing roll 3-8 helping guide the detached label under the lineal object and above the compression rolls 3-4 and 3-5.

The lifting members 4-2 and 4-3 are timed to lower or release the lineal object 4-1 when the label 4-7 is directly underneath it with one-half of the label to the left of the lineal object and one-half of the label to the right of the lineal object. As the lineal object travels back to its original position 4-1, the label is carried between the compression rolls 4-4 and 4-5 which form a squeeze point and press the adhesive sides of the label 4-7 against each other thus closing the label around the lineal object as it returns to its original position. This sequence must be accomplished in less time than it takes the lineal object 4-1 to move the label past the compression rolls 4-4 and 4-5.

What is claimed:

1. A device for attaching labels to a lineal object, comprising:
- a supply roller to hold and dispense a continuous roll of backing web with separate adhesive-backed labels disposed thereon;
- a take-up roller, powered by a driving mechanism, to pull and receive said continuous roll of backing web;
- a guide roller disposed in a path between said supply roller and said take-up roller, so that said continuous roll of backing web bends sharply around the guide roller at a peeling location, causing an adhesive-backed label to peel apart from the backing web;
- two compression rollers disposed below the guide roller;
- and one or more lifting members for raising a lineal object between a first position below the compression rollers and a second position which is above the compression rollers and adjacent to the peeling location;
- wherein at the second position the lineal object receives an adhesive-backed label from the backing web, and wherein the lineal object having the label thereon is returned to the first position, passing between the two compression rollers and causing the label to adhere to itself, enveloping the lineal object.

2. The device of claim one wherein the lineal object is a wire characterized by having a continuous flow and wherein the device is located to apply labels around the continuous flow of wire as the wire is manufactured.

3. The device of claim one wherein the lineal object is a band characterized by having a continuous flow and wherein the device is located to apply labels around the continuous flow of banding as the band is manufactured.

4. The device of claim one wherein the lineal object is twine characterized by having a continuous flow and wherein the device is located to apply labels around the continuous flow of twine as the twine is manufactured.

5. The device of claim one wherein the lineal object encases a hay bale traveling out of a hay baler and wherein the device is located to apply labels to the lineal object encasing the hay bale as the hay bale is traveling out of the hay baler.

6. The device of claim one wherein the lineal object encases a cotton bale of harvested cotton and wherein the device is located to apply labels over the lineal object on a module building implement in the harvesting of cotton.

7. The device of claim one wherein the lineal object is a wire characterized by having a continuous flow and wherein the device is located to apply labels over the lineal object encasing loose material on a continuous flow basis.

8. The device of claim one and further comprising:
- a peel plate made from smooth material, said peel plate located adjacent the guide roller separating labels from backing web and near the peeling location and adjacent to the lineal object when the lineal object is lifted to the second position, wherein said peel plate functions to help guide the label under the lineal object as the label is separated from the backing web.

9. A device for attaching labels to a lineal object, comprising:
- a supply roller to hold and dispense a continuous roll of backing web with separate adhesive-backed labels disposed thereon;
- a take-up roller, powered by a driving mechanism, to pull and receive said continuous roll of backing web;
- a guide roller disposed in a path between said supply roller and said take-up roller, so that said continuous roll of backing web bends sharply around the guide roller at a peeling location, causing an adhesive-backed label to peel apart from the backing web;
- a squeeze point disposed below the guide roller and peeling location; and,
- one or more lifting members for raising a lineal object between a first position below the squeeze point and a second position which is above the squeeze point and adjacent to the peeling location; and,
- wherein at the second position the lineal object receives an adhesive-backed label from the backing web, and wherein the lineal object having the label thereon is returned to the first position, passing through the squeeze point and causing the label to adhere to itself, enveloping the lineal object.

10. The device for attaching labels to a lineal object of claim 9 and wherein the lineal object is characterized by moving at a continuous flow basis, wherein the moving lineal object is lifted by the one or more lifting members from the first position to the second position to receive the label onto the moving lineal object and then returned to the first position by passing through the squeeze point.

11. The device for attaching labels to a lineal object of claim 10 and wherein the moving lineal object is selected from the group consisting of twine, wire, and banding.

12. The device for attaching labels to a lineal object of claim 10 and wherein labels to be attached to the moving lineal object are identification tags used to identify properties of the lineal object.

13. The device for attaching labels to a lineal object of claim 10 and wherein labels to be attached to the moving lineal object are identification tags used to identify properties of material encased by the lineal object.

14. The device for attaching labels to a lineal object of claim 10 and wherein labels to be attached to the moving lineal object are identification tags used to identify properties of material encased by the lineal object, and further wherein the material encased by the lineal object is hay and the labels are identification tags used to identify properties of the hay encased by the lineal object.

15. The device for attaching labels to a lineal object of claim 10 and wherein labels to be attached to the moving lineal object are identification tags used to identify properties of material encased by the lineal object, and further wherein the material encased by the lineal object is cotton and the labels are identification tags used to identify properties of cotton encased by the lineal object.

16. The device for attaching labels to a lineal object of claim 9 and further comprising:
- a peel plate located near the guide roller and the peeling location and situated adjacent to the lineal object when the lineal object is lifted to the second position, wherein the peel plate guides the label under the lineal object as the label is separated from the backing web at the guide roller.

17. The device for attaching labels to a lineal object of claim 9 and wherein the squeeze point includes two compression rollers.

* * * * *